WAYSTATION TELEPHONE SYSTEM

Filed Dec. 14, 1959 5 Sheets-Sheet 1

INVENTORS
Robert P. Dimmer
Edward L. Roback
BY C. A. Gulbrandsen
Atty.

April 7, 1964 R. P. DIMMER ETAL 3,128,346

WAYSTATION TELEPHONE SYSTEM

Filed Dec. 14, 1959 5 Sheets-Sheet 2

INVENTORS
Robert P. Dimmer
Edward L. Roback
BY C. A. Gulbrandsen
Atty.

April 7, 1964 R. P. DIMMER ETAL 3,128,346

WAYSTATION TELEPHONE SYSTEM

Filed Dec. 14, 1959 5 Sheets-Sheet 3

INVENTORS
Robert P. Dimmer
Edward L. Roback
BY
C. A. Gulbrandsen
Atty.

April 7, 1964 R. P. DIMMER ETAL 3,128,346

WAYSTATION TELEPHONE SYSTEM

Filed Dec. 14, 1959 5 Sheets-Sheet 4

INVENTORS
Robert P. Dimmer
Edward L. Roback
BY
C. A. Gulbrandsen
Atty.

April 7, 1964 R. P. DIMMER ETAL 3,128,346

WAYSTATION TELEPHONE SYSTEM

Filed Dec. 14, 1959 5 Sheets-Sheet 5

INVENTORS
Robert P. Dimmer
Edward L. Roback
BY C. A. Gulbrandsen
Atty.

United States Patent Office 3,128,346

Patented Apr. 7, 1964

3,128,346
WAYSTATION TELEPHONE SYSTEM

Robert P. Dimmer, Lombard, and Edward L. Roback, Chicago, Ill., assignors to Automatic Electric Laboratories, Inc., a corporation of Delaware Filed Dec. 14, 1959, Ser. No. 859,217
7 Claims. (Cl. 179—17)

Our invention relates in general to a waystation telephone system and more specifically to a system including a waystation telephone line linked to a standard telephone system in such a manner that calls may be made back and forth between waystations on the waystation line, or to and from waystations to the regular subscribers of the telephone system.

The system as illustrated makes use of the well-known Western Electric Co. selectors at each waystation which respond to 3½ cycle rate pulses and also of the well-known Western Electric senders known as the 60B which sends such pulses. The details of such sender and selector, being well-known, have not been shown in detail herein.

The object of the present invention is to terminate a waystation line in a control equipment in a P.A.X or telephone exchange and supply a dialling circuit for each waystation to control such equipment to select and signal a regular telephone subscriber in the exchange without the intervention of the dispatcher as in present practice. Also in the equipment we have supplied control circuits which may be seized by a subscriber in the regular telephone exchange, and are operative to respond to regular dial pulses and convert them to 3½ cycle pulses which are transmitted over a seized waystation line to signal a particular waystation by means of the usual W.E. selector thereat.

In the present arrangement an oscillator is provided in the dialling circuit of each waystation which may be controlled to generate alternating currents of either 1500 c.p.s. or 2000 c.p.s. A dial key is provided to cause the oscillator to transmit 1500 c.p.s. over the line to operate a detector to seize the control circuit at the telephone exchange. After dial tone is received a standard calling device in the dialling circuit is operated to cause the oscillator to transmit pulses of 2000 c.p.s. alternating current through the control circuit to operate a pulse detector therein. This in turn controls the line circuit to the telephone exchange to send regular pulses thereover to operate the automatic switches in the exchange to select and signal a called party therein.

In calls from the telephone exchange to substations on the waystation line a terminal is provided in the exchange which may be seized by automatic switches therein to connect with the waystation line. A relay in the control circuit, associated with this terminal, is operated by impulses corresponding to digits of a desired station to store such digits on a series of rotary switches. Another rotary switch is then operated successively in accordance with the stored digits, to convert such digits into pulses first of 7 cycles per second and then to pulses of 3½ c.p.s., instead of the 10 c.p.s. normally used in the telephone exchange, and transmit such series of pulses over the waystation line, by means of a Western Electric Co. sender, to operate the waystation selectors at the various stations and signal the wanted station.

Calls may also be made from one waystation to another by seizing the control equipment and operating it in the same manner as for an exchange call except that the number of the waystation line is dialled and the selector seizes either the same or another waystation line and signals the substation thereon in the same manner as in a call from an exchange subscriber.

Having given a general description of the system, we will now describe the various features in detail by reference to the accompanying drawings in which.

*Calls From a Waystation to a P.A.X Subscriber*

Figure 1:
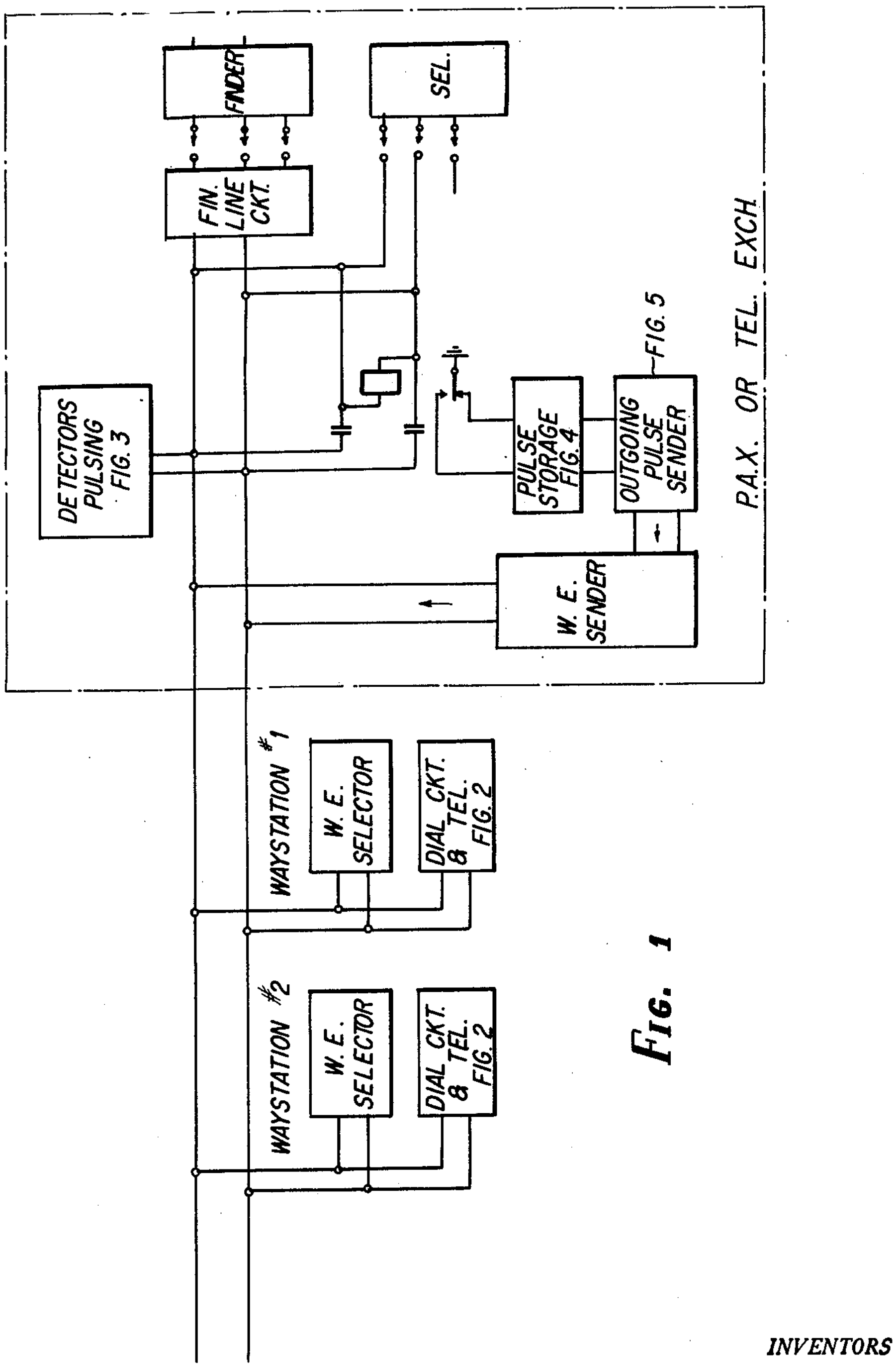
FIG. 1 is a block diagram showing the waystation line as connected to a control circuit termination in a telephone exchange or P.A.X and showing by means of blocks the various equipment for receiving and making calls to and from the line.
Figure 2:
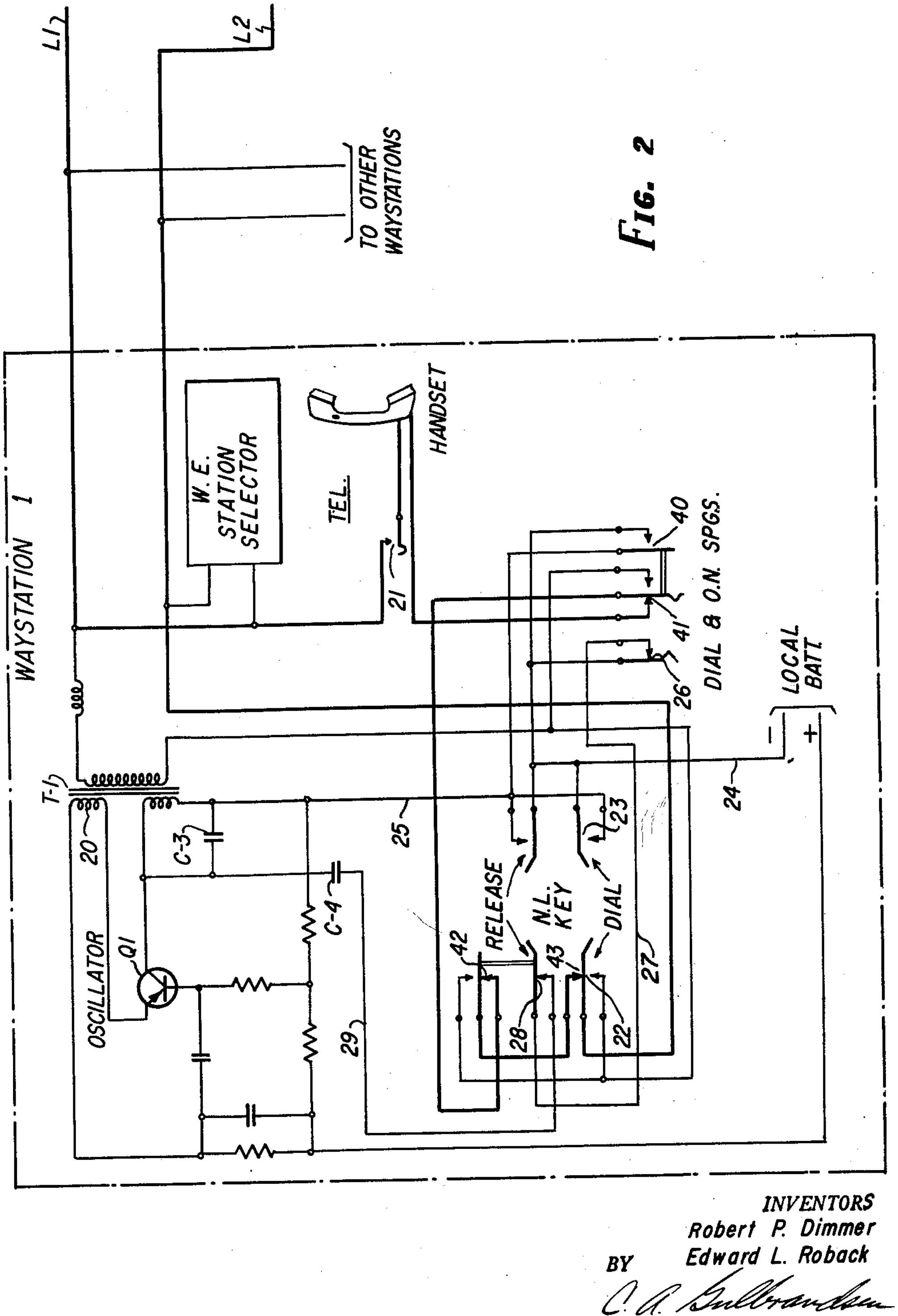
FIG. 2 shows the novel dialling circuit and equipment at a waystation.

We will first describe a call from the waystation #1 shown in FIG. 2 to a telephone subscriber in the exchange. The waystation 1 includes an oscillator of known type which can be controlled to generate either 1500 or 2000 c.p.s. currents and is a conventional collector feedback type of oscillator with a winding 20 of transformer T–1 arranged to feed back energy from the collector of transistor Q1 to the emitter thereof to sustain oscillations.

The subscriber at waystation 1 will first listen in on the line by means of the usual switch hook 21 (or a monitor key) to see if the line is in use or if any other subscriber is dialling and if not, will throw the N.L. key to dial position for a short interval to close springs 22 and 23 to close the circuit to the waystation line at springs 22 and to connect battery from lead 24 to lead 25 and to the oscillator to cause it to generate alternating current of 1500 cycle and transmit it to the waystation line through transformer T–1. Battery from lead 24 is also connected through dial springs 26, lead 27, release springs 28, lead 29, and condenser C4 to the oscillator. The condenser C3 is tuned so that the oscillator generates 1500 c.p.s. with battery connected to both leads 25 and 29 and 2000 c.p.s. with battery connected only to lead 25.

Figure 3:
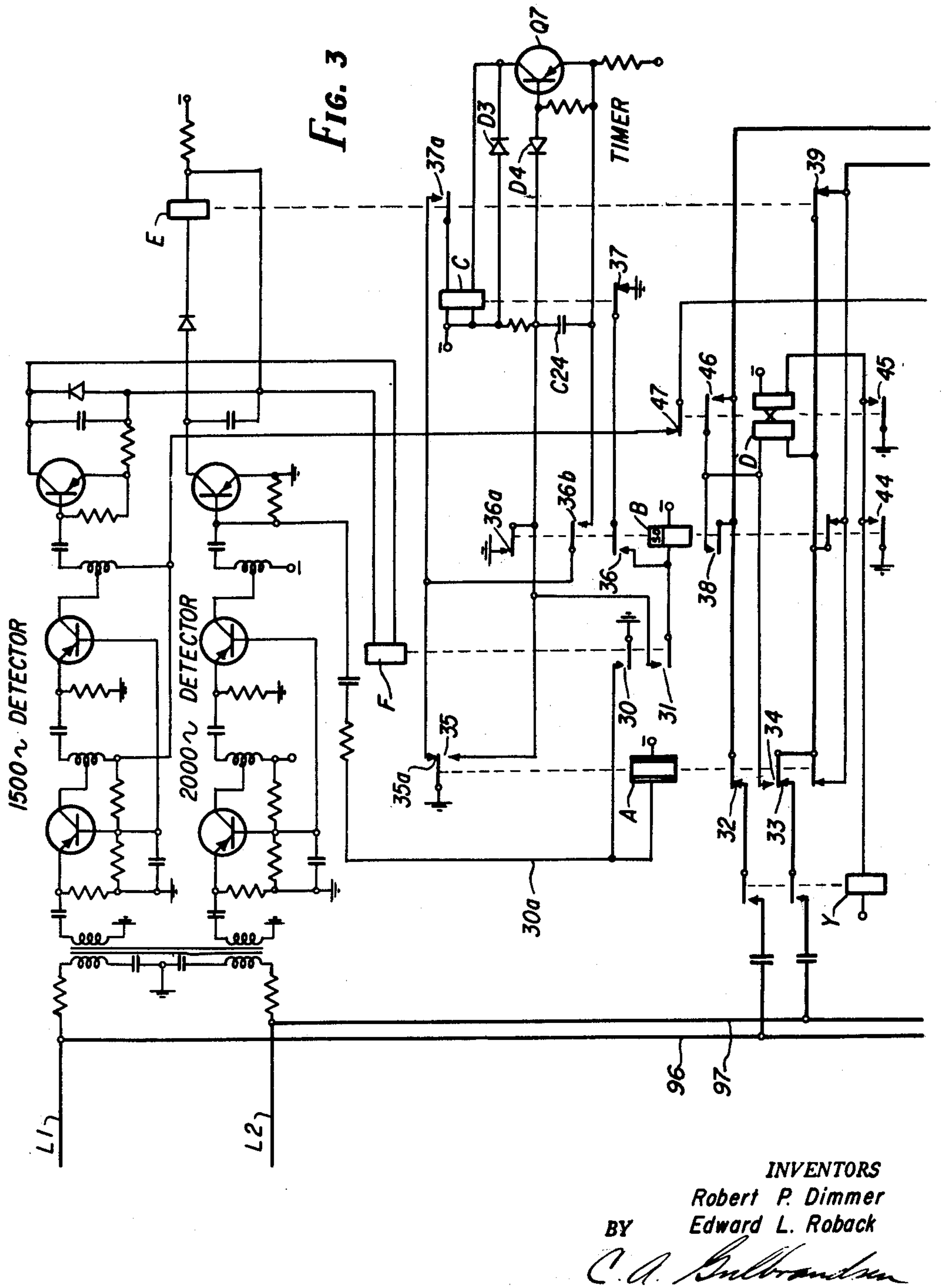
FIG. 3 shows the receiving part of the line control equipment in the telephone exchange.

The 1500 c.p.s. current, when applied to the waystation line is picked up at the control equipment by the 1500 cycle detector of FIG. 3. This 1500 cycle detector as well as the 2000 cycle pulse detector are of known type of detectors having two stages of transistorized frequency selective amplification feeding a single non-operated relay circuit. When the 1500 cycle tone is received the detector functions in the usual manner to cause operation of the relay F in its output. The key is held in dial position for about 2 seconds to energize relay F for a short period to close springs 30 and 31 to in turn energize slow-release relay A over a circuit including springs 30. Relay A opens springs 32 and 33 to disconnect the waystation line from the branch thereof leading to the telephone equipment to prevent feedback of pulses, closes springs 34 to short the left hand winding of relay D, and closes springs 35 to close a circuit to the electronic timer including the transistor Q7, condenser C24, diodes D3 and D4, and certain resistors controlling relay C. Relay A also completes a circuit for relay B through springs 35 and 31 and this relay locks energized through its springs 36 and springs 37 of timer relay C. Relay B completes the dialling circuit to the telephone exchange at springs 38 to control the line circuit at the P.A.X to cause it to be seized by the usual finder in the exchange. Springs 30 also close a paralyzing circuit for the 2000 cycle detector over a lead 30*a*, while springs 36*a* of relay B are opened and 36*b* close to prepare the timer circuit. The dialling circuit extends from the — line through springs 38, springs 34, and impulse sending springs 39 of relay E to the positive line. The dial key is released at the waystation after a short interval to open springs 22 and 23 and if nothing else occurs relay F will deenergize and after a short release time relay A will release and connect ground through springs 35*a* and 36*b* to the timer which will function, after about a minute, to operate relay C to open springs 37 and release the locked up relay B.

If the subscriber proceeds to dial the digits of the number of a called subscriber, the O.N. springs of the dial close and springs 40 again connect battery to lead 25 and springs 41 again connect the oscillator to the line through springs 41, springs 42 of the release key and springs 43 of the dial key. The springs 26 of the dial now interrupt the connection of battery to lead 29 for each impulse of a digit and cause the oscillator to send pulses of 2000 cycle over the line alternated with 1500 cycle current. The 2000 cycle detector at the exchange (FIG. 3) operates its pulsing relay E with each pulse of 2000 cycle to open springs 39 in the dialling circuit to the exchange. Relay F is also intermittently energized by the 1500 cycle current which is interspersed with the 2000 cycle pulses and maintains relays A and B energized and the timer relay C ineffective.

After the exchange equipment has been operated in the usual manner by the pulses sent by relay E and its springs 39 and the selectors and connectors thereof have extended a connection to and signalled a called subscriber, the usual reversal of battery is caused by the response of the called party. This reversal of battery energizes the left hand winding of relay D in the proper direction to cause it to assist the right hand winding of D relay which had its circuit closed at springs 44 of relay B, so that this relay energizes to close its springs 45 and 46 and open springs 47. Springs 45 hold relay Y energized, which was originally energized by the closure of springs 44 of relay B, to complete the talking circuit from the waystation line to the talking circuit leading to the exchange. Springs 46 shunt the springs 38 to hold the left hand winding of relay D across the talking circuit while springs 47 open the battery connection to the 1500 cycle detector. A short time after the dial returns to normal and the O.N. springs open and relay F deenergizes, the relay A falls back to open its various contacts and completes the talking circuit at springs 32 and 33 and conversation may proceed. The waystation subscriber may release before the called party answers by operating the Release key at the substation, to place battery only on lead 25 and connect the oscillator to the waystation line to send 2000 cycle current thereover to operate relay E for a longer period to cause relay C to energize over springs 35*a* and 37*a* to open the circuit of relay B and release relays Y and D.

*Calls From Exchange to Waystation*

Figure 4:
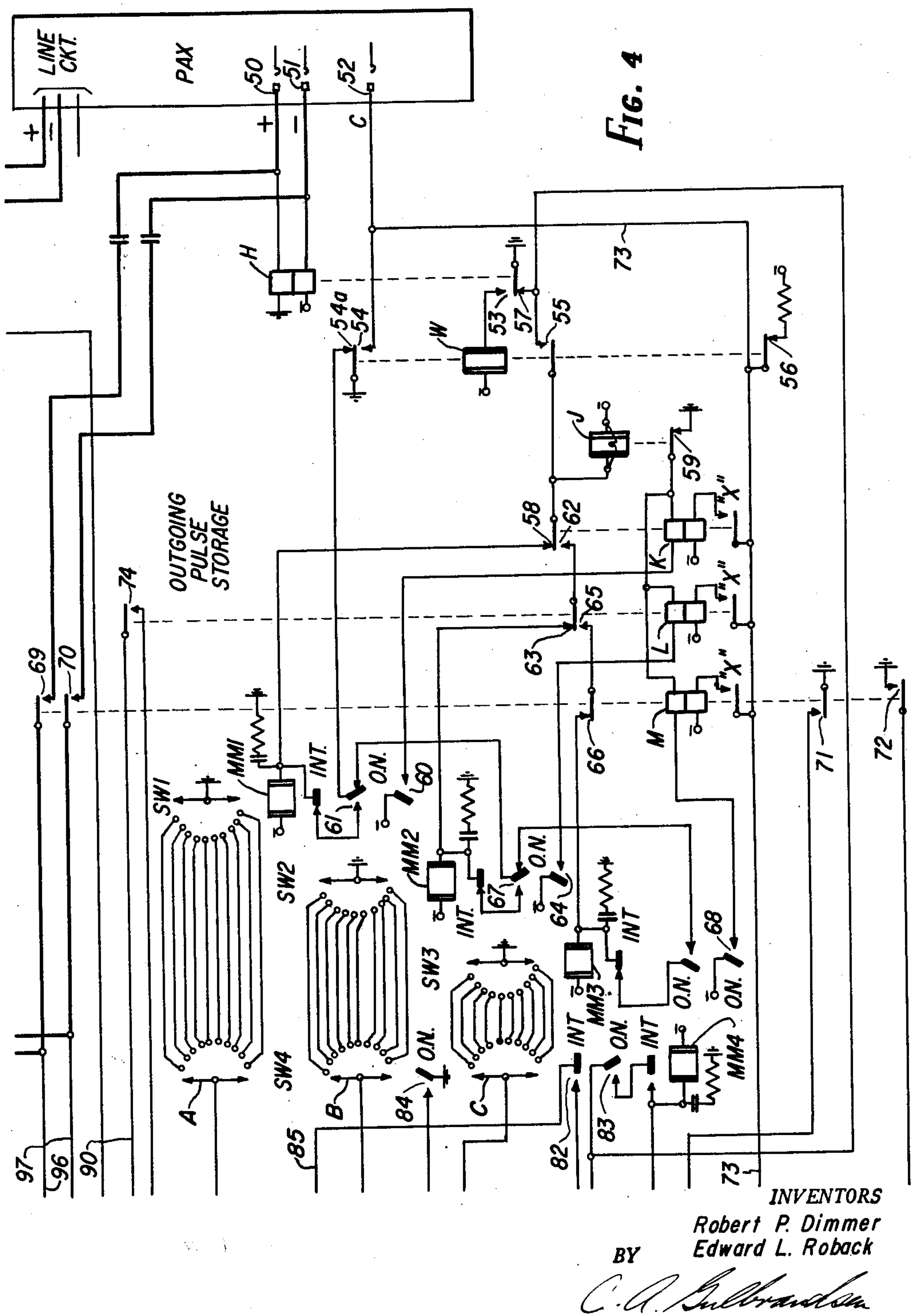
FIG. 4 shows the line termination in the P.A.X together with the outgoing pulse storage equipment of the control circuit.

When a subscriber in the P.A.X desires to call a waystation subscriber he operates the switches in the exchange in accordance with the number assigned to the waystation line to cause a selector switch to seize the line terminals 50 and 51 and hold conductor 52 in FIG. 4 to energize relay H. Relay H energizes to close springs 53 to energize slow relay W to in turn close springs 54 to place ground on the hold terminal 52 to hold the connection, prepares a circuit for slow relay J at springs 55 and removes battery from the hold conductor at springs 56. Waystations of this type, whether on long lines along railroads or pipe lines or in similar situations usually use the type 60 Western Electric selectors which are well-known in the art and operate on high voltage pulses of 3½ cycles such as sent out by the Western Electric sender. Three digits are required to select a station and the sum of the three digits must always equal 17. In the present case, the 10 c.p.s. pulses sent from the P.A.X dial must be converted to the 3½ cycle W.E. pulses.

These three digits, received over terminals 50 and 51 from the P.A.X, are used to operate relay H to in turn store these digits on rotary switches SW–1, SW–2 and SW–3 as follows: The impulses of the first digit received by relay H cause it to operate in response to such pulses to intermittently close springs 57 to complete the circuit of motor magnet MM–1 to cause it to step the wiper SW–1 to a position corresponding to the digit. The circuit of MM–1 includes springs 57, springs 55, springs 58, and the motor magnet. A branch of this circuit causes relay J, which is slow-acting, to energize and hold springs 59 open until the pause between digits. Relay W, also being slow-acting, remains energized. As soon as relay H remains energized during the interdigital pause, springs 57 open the circuit of relay J for a sufficient time to cause it to deenergize and complete a circuit through springs 59, upper winding of relay K and O.N. 60 which closed as soon as wiper SW–1 moved off normal. O.N. springs 61 also operate to prepare a restoring circuit for MM–1. When relay K energizes over the above circuit, it opens springs 58 in the circuit of MM–1 and closes springs 62 in the circuit of MM–2. When relay H operates in response to impulses of a second digit a similar pulsing circuit is completed through springs 57, 55, 62 and 63 for motor magnet MM–2 to operate it to a position corresponding to the second digit. At the end of the pulses for the second digit, relay J again restores and completes the circuit of relay L through O.N. springs 64 of switch SW–2 to open springs 63 in the circuit of motor magnet MM–2 and prepare the circuit of motor magnet MM–3 at springs 65. O.N. springs 67 also prepare a restoring circuit for magnet MM–2. Relay H again operates in response to the impulses of the third received digit, to in turn complete the circuit of magnet MM–3 through springs 57, 55, 62, 65, 66 and the magnet to step wiper SW–3 to a position corresponding to the 3rd digit. Certain leads extending from the banks of wipers SW–1, SW–2 and SW–3 have now been marked by ground potential in accordance with the three stored digits. At the end of the third digit, relay M is operated through springs 59 and the O.N. springs 68 and relays K, L and M are locked energized through their lower contacts and over hold conductor 73 to ground through springs 54 of relay W. Relay M at springs 69 and 70, completes the talking circuit through to the waystation line. Relay M in addition, at springs 71, completes a circuit through springs 80 of relay V and springs 81 of interrupter relay N to motor magnet MM–4 to cause the three wipers A, B and C of switch SW–4 to move to test the conductors connected to the bank of switch SW–1. Relay M also closed a circuit for relay N at springs 72 which relay is timed by condensers C7 and C8 to step switch SW–4 by means of magnet MM–4 at a rate of 7 steps per second, by opening springs 81 at that rate. When magnet MM–4 first energizes, the O.N. springs 83 and 84 close to prepare a restoring circuit through springs 83 and a hold circuit at springs 84. The interrupter springs 82 close with each energization of magnet MM–4 to send pulses, at 7 pulses per second, over conductor 85 to the pulse converter comprising relays U and T. The first connection of ground to 85 causes current to flow through opposing windings of relay T through contacts 86 and 87 so that it does not energize, and through the lower winding only of relay U which energizes to close springs 88. These springs complete a new circuit for lower winding of T to the hold conductor 73 and ground through springs 54 of relay W, and complete a new hold circuit for the lower winding of relay U. As soon as the first pulse ceases, and ground is removed from conductor 85 by springs 82, then the circuit of the upper opposing winding of relay T is opened and this relay is operated due to the continued energization of its lower winding. Relay T closes springs 89 to prepare a circuit for the opposing upper winding of relay U, and opens the circuit of its own upper winding at springs 86. The next ground pulse on conductor 85 therefore causes relay U to fall back due to energization of both windings, to restore the original circuit for the lower winding of relay T at springs 87 and hold that relay operated. The next removal of ground from conductor 85 opens the circuit of all windings of relays T and U to restore them to normal in preparation for the next cycle of operation. During this alternate operation of relays T and U the 7 cycle per second pulses on conductor 85 are converted into 3½ pulses per second over lead 91 through springs 92 to the pulsing relay 26*a* of the W.E. sender (not shown) to cause the sender to transmit 3½ p.p.s. of high voltage over the leads 96 and 97 of FIG. 3 to the waystation line to operate the W.E. selectors at the various substations thereon. The starting circuit of the W.E. sender over lead 90 was closed by springs 74 of the relay L (FIG. 4) after the operation of switch SW–2.

As soon as the wiper A of switch SW–4 finds the grounded contact in its bank as determined by the operation of switch SW–1 for the first digit, a circuit is completed from wiper A through springs 99 for relay V, which operates to open springs 80 in the circuit of MM–4 and stop operation thereof. Relay V locks itself energized through O.N. springs 84, and closes springs 96 in the circuit of slow relay O. Relay O completes a circuit for relay P at springs 98 and completes a restoring circuit at springs 97 for magnet MM–4 through O.N. springs 83 and the interrupter springs of the magnet. Relay P energizes and locks energized through its upper winding to conductor 73 and opens the springs 99 and closes springs 100, to open the original circuit for relay V to wiper A and connect it instead to wiper B for future control. Relay P also prepares the circuit of relay Q at springs 103. The self interrupted energizing circuit of magnet MM–4 causes it to rapidly return the wipers of SW–4 to normal, at which time O.N. springs 83 and 84 open to stop further operation of the switch and open the locking circuit of relay V.

The release of relay V and closure of its springs 80, again causes magnet MM–4 to operate to step its wipers and in this case wiper B is effective to control the stopping of the wipers when the conductor marked for the second digit, by switch SW–2, is reached by wiper B. The impulses are again transmitted by springs 82 to conductor 85, and the converter again operates to send 3½ pulses per second to the sender. As soon as wiper B reaches its marked contact, the relay V again operates and together with relay O, again causes the switch SW–4 to return to normal. When relay O released after the release of relay V, it closed springs 102 to complete the circuit of relay Q through springs 103, closed by relay P. Relay Q operates to close springs 104 in the circuit of relay R and locks energized to hold conductor 73. The energization of relay O after the second digit again opens the circuit of MM–4 and also closes the circuit for relay R at springs 105 over hold conductor 73 to open springs 101 in the circuit of wiper B and close the V relay circuit to wiper C at springs 106. The operations for the repeating and converting of the 3rd digit is the same as for the other digits except that in this case the stopping of the switch is controlled over wiper C to send the digit stored in its bank. The relay V again energizes over the circuit including wiper C and springs 106 and 100 when the grounded contact is reached by wiper C to again open the magnet circuit and close the circuit of relay O. Relay S was energized by the last release of relay O, after the second digit, through the springs 107 and 108 and locks energized to hold conductor 73. The energization of relay O after the 3rd digit closes springs 110 to complete a circuit for the 2 second timer, which closes springs 111 in the circuit of relays X and Z. Relay X at springs 95 and 94 either places ground on lead 91 or removes it, according to the last position of relay V, to send an 18th pulse to W.E. senders. The W.E. sender as described sends the pulses of the three converted digits over leads 96 and 97 in FIG. 3 to the waystation line to signal one subscriber. In the waystation selectors each series of digits must total 17 pulses and with the proper combination will ring a bell at the station desired. An 18th pulse is required after an interval to stop the ringing of the bell and this is the 18th pulse supplied by the relay X. The energization of relay Z also opens the circuit to the 2 second timer and opens springs 114 to remove ground from the start lead 90 to the sender, to allow the sender to return to normal. All of the equipment in the control circuits of FIGS. 4 and 5 will be restored to normal when the subscriber in the exchange hangs up to release relay H of FIG. 4 to in turn open the circuit of the release relay W. Relay W removes ground from the holding conductor 73 at springs 54 to release all of the various relays locked up thereto and supplies ground to the restoring circuits of the rotary switches at springs 54*a*.

*Calls From Waystation to Waystation*

Figure 5:
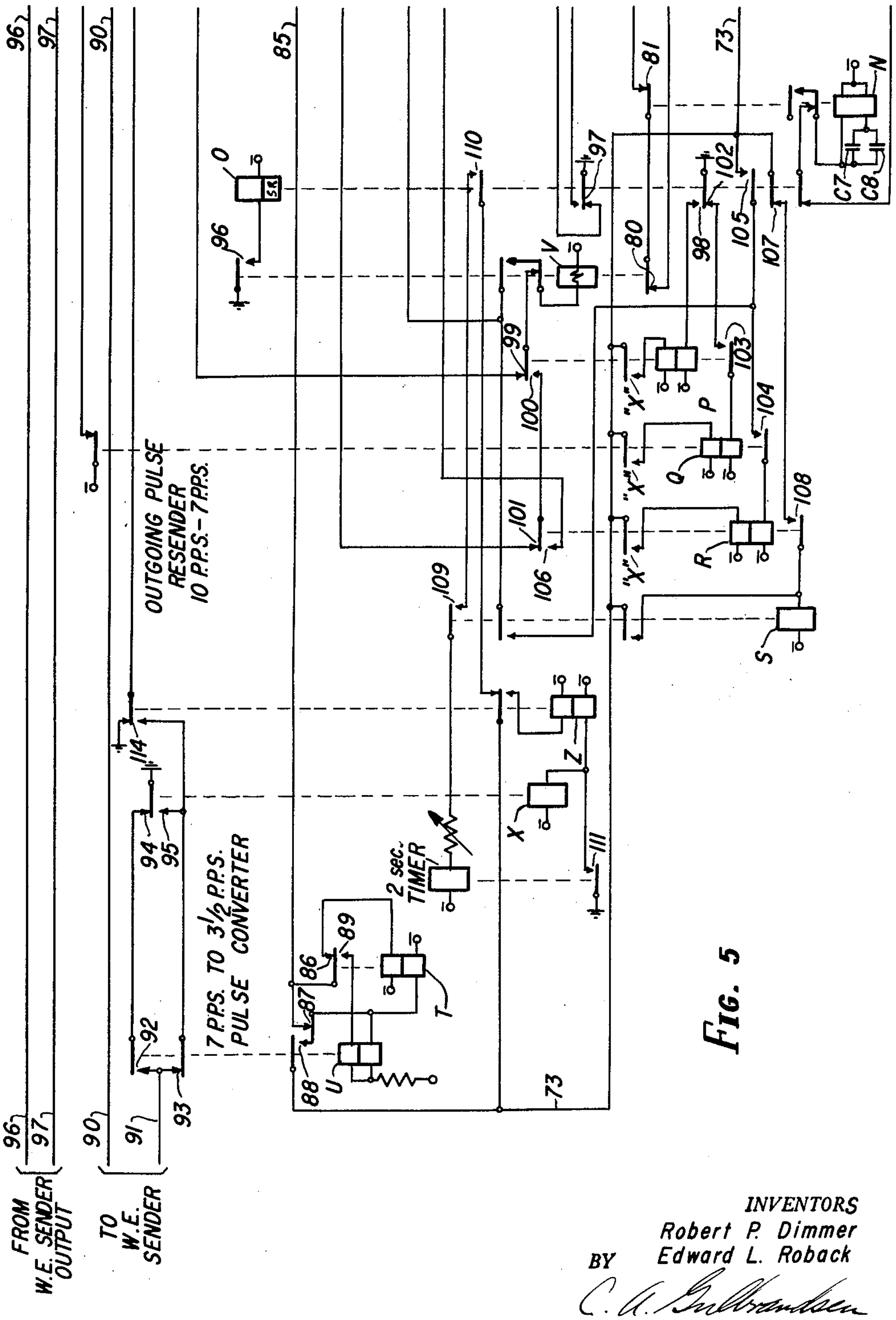
FIG. 5 shows the remainder of the control circuit equipment including the outgoing pulse resender and converter.

It should be clear that one waystation may call another by extending the call as described to the P.A.X and then dialling the number of the same waystation line or another to operate the equipment of FIGS. 4 and 5 in the same manner as just described to signal another subscriber. As there is no reverse battery received in this case to operate relay D, the timer relay C will release the connection to the P.A.X after about a minute. After this release a P.A.X subscriber may place another call to another waystation on the same line. With this arrangement whether a waystation places a call to another waystation or to a P.A.X subscriber, another P.A.X subscriber may break in on the existing circuit in case of emergency which is a requirement in railroad use. This arrangement also permits a conventional dial subscriber to dial into a Western Electric waystation selector system and permits dialling over very long distances.

Having fully described the various features and aspects of the invention, what is considered to be new and is desired to be protected by Letters Patent, will be pointed out in the appended claims.

What is claimed is:

1. In a communication system, a waystation line having a plurality of waystations connected thereto, each having a waystation selector, a dial telephone exchange having a plurality of regular subscribers lines each having a calling device, and having a plurality of automatic switches, controlled by dial impulses, to extend connections, a line terminating equipment at the exchange in which the waystation line terminates, said equipment having a calling terminal available to seize an automatic switch to extend connections to called subscribers lines, and a called terminal available to be seized by automatic switches to extend connections from calling subscribers lines to the waystation line, an oscillator at each waystation, means at each waystation for controlling its oscillator to transmit currents of one high frequency over the waystation line to the terminating equipment and for controlling its oscillator to transmit impulses of another high frequency alternated with pulses of said one high frequency over the line, means in said equipment operated responsive to the receipt of current of said one frequency to cause said equipment to be seized by an automatic switch in the exchange, means in the equipment operated in response to the receipt of said impulses of current of said one and another frequency to transmit impulses of regular current to the exchange to operate automatic switches to extend a connection to and signal a called party in the exchange.

2. In a communicating system, a telephone exchange having regular telephone lines and automatic switches operated by impulses at the regular rate of 10 pulses per second for extending connections, a waystation line having a plurality of stations, each having a waystation selector operable by pulses of 3½ per second and a regular impulse sender for transmitting pulses of high frequency currents at the rate of 10 pulses per second, a terminating equipment for the waystation line in the exchange having calling and called terminals therein accessible to the automatic switches for extending connections between the waystation line and regular subscribers lines in the exchange, means in said equipment operated in response to said pulses of high frequency over the waystation line for repeating said pulses to the switches in the exchange over said calling terminal as regular pulses of direct current at 10 pulses per second, means, including certain of the switches in the exchange, for seizing said called terminal and transmitting thereover, direct current impulses of 10 pulses per second in accordance with the call number of a particular station on the waystation line, and means in the equipment for converting said received pulses into pulses of 3½ pulses per second and transmitting said converted pulses over said line to operate the waystation selectors thereon, to signal a particular station on the line.

3. In a telephone system, an exchange having regular telephone lines and automatic switches operated by impulses of a standard rate of speed for extending connections, a waystation line having a plurality of stations thereon and having a waystation selector at each station responsive to a plurality of series of pulses of a lower rate of pulses per second to signal the subscriber at the station and an impulse sender for transmitting impulses at said standard rate, a terminal in said exchange over which said line may be seized and another terminal over which connections may be extended to the lines in the exchange, means including said switches for seizing said first terminal and transmitting thereover, a plurality of series of pulses of said standard rate corresponding to the digits in the call number of a station, a plurality of storage switches associated with said terminal, said switches successively operated in response to the received standard rate pulses to register the digits, a sending switch also associated with said terminals, means for repeatedly operating said sending switch at an intermediate speed, once for each registered digit, to successively transmit a plurality of pulses at said intermediate speed in accordance with the digits registered in said storage switches, and means operated in response to the pulses of said intermediate speed to convert said pulses into pulses of said lower rate and transmit the same over said waystation line to operate the selectors thereon to signal the station whose call number was stored, and means operated by the impulse sender on said waystation line for operating said switches to extend a connection to a regular line in the exchange.

4. A communicating system such as claimed in claim 3, in which the sending switch is stepped at a rate of seven steps per second to transmit pulses at said intermediate speed of seven pulses per second to said converter, and in which said converter transmits pulses at said low rate of three and one half pulses per second over said line.

5. In a communication system, a waystation telephone line having a plurality of stations in bridge of the line at various points, said line connected to an automatic telephone exchange having automatic switches therein for extending connections from the waystation line to telephone lines in the exchange, an oscillator at each station on the line, a calling and release key and a calling device at each station, means controlled by the key when operated to call position to cause said oscillator to transmit current of one frequency over the line and to cause the oscillator to transmit current of another frequency over the line when operated to release position, and means, controlled by said calling device, when operated, to cause said oscillator to alternately transmit currents of both of said frequencies over said line, and means in the exchange operated in response to the receipt of current of said one frequency to cause one of said switches to seize said line, and operated in response to said alternate currents of both said frequencies to operate said switches to extend a connection to a line, and operated in response to the receipt of current only of said other frequency, to release any connection extended.

6. In a communication system, a waystation line having a plurality of stations thereon each having a calling device and a waystation selector thereat, a telephone exchange having regular subscribers and automatic switches for extending connections between the lines, a calling terminal and a called terminal in the exchange connected to the said waystation line, means at each waystation, controlled by the operation of the calling device thereat, for transmitting impulses of high frequency alternating current over the line to the exchange, means in the exchange operated by said impulses in one instance for extending a connection to a line in the exchange and in another instance to the called terminal of the waystation line, and means operated over the called terminal, when the connection is extended thereto, responsive to said impulses for transmitting impulses of a different character over the waystation line to operate the waystation selectors to signal another station thereon.

7. A communication system such as claimed in claim 6 in which the alternating current pulses received from the waystation line are converted into regular direct current pulses of a certain speed which are used to operate the automatic switches and are repeated over the called terminal when the connection is extended thereto, and in which the said means, operated over the called terminal, is operated to convert said regular direct current pulses into pulses of a lower rate of speed, and to transmit said last pulses over the waystation line.

References Cited in the file of this patent

UNITED STATES PATENTS

| | | |
|---|---|---|
| 2,467,490 | McClew et al. | Apr. 19, 1949 |
| 2,516,814 | Voss | July 25, 1950 |
| 2,592,813 | Lomax | Apr. 15, 1952 |
| 2,753,403 | Caracciolo | July 3, 1953 |
| 2,810,788 | Kahn | Oct. 22, 1957 |
| 2,824,173 | Meacham | Feb. 18, 1958 |
| 2,848,546 | Pharis | Aug. 19, 1958 |
| 2,908,762 | Meacham | Oct. 13, 1959 |
| 3,015,696 | Herbig et al. | Jan. 2, 1962 |